United States Patent [19]
Mann

[11] Patent Number: 5,816,767
[45] Date of Patent: Oct. 6, 1998

[54] TRANSPORT LOCKING SYSTEM FOR MOVABLE-DECK VEHICLE

[76] Inventor: Fred W. Mann, Box 444, Waterville, Kans. 66548

[21] Appl. No.: 677,660

[22] Filed: Jul. 8, 1996

[51] Int. Cl.[6] .................................................. B65G 67/02
[52] U.S. Cl. .......................... 414/537; 414/480; 14/71.7; 92/15
[58] Field of Search .................... 414/537, 538, 414/480; 92/15, 20; 14/71.7

[56] References Cited

U.S. PATENT DOCUMENTS

| | | |
|---|---|---|
| 2,487,325 | 11/1949 | Foster ....................................... 414/484 |
| 2,717,707 | 9/1955 | Martin ................................. 414/483 X |
| 3,159,294 | 12/1964 | Forsythe, Jr. . |
| 3,335,887 | 8/1967 | Snook . |
| 3,472,406 | 10/1969 | Slipp . |
| 3,550,801 | 12/1970 | Larson et al. . |
| 3,606,059 | 9/1971 | Haberle, Jr. . |
| 3,927,775 | 12/1975 | Graupmann . |
| 4,133,440 | 1/1979 | Heidrick, Jr. ............................ 414/483 |
| 4,243,353 | 1/1981 | Reed ......................................... 414/439 |
| 4,842,470 | 6/1989 | Hubbard .................................. 414/478 |
| 4,986,719 | 1/1991 | Galbreath ................................ 414/478 |
| 5,011,362 | 4/1991 | Pijanowski .............................. 414/480 |
| 5,094,583 | 3/1992 | Bills, Jr. et al. ......................... 414/537 |
| 5,216,942 | 6/1993 | Sendoykas ............................... 92/20 X |
| 5,263,807 | 11/1993 | Pijanowski .............................. 414/480 |
| 5,324,160 | 6/1994 | Smith ....................................... 414/475 |
| 5,340,267 | 8/1994 | Stoll et al. ............................... 414/537 |

FOREIGN PATENT DOCUMENTS 3629842   3/1988   Germany .................................. 14/71.7

*Primary Examiner*—Stephen T. Gordon
*Attorney, Agent, or Firm*—Litman, McMahon & Brown, L.L.C.

[57] ABSTRACT

A transport locking system for a movable-deck trailer includes a telescoping sleeve which is positioned in parallel with a main deck piston and cylinder unit beneath the trailer deck. The main cylinder and the telescoping sleeve are placed in a neutral position when the deck is in the transport position, extended to raise the deck to a dock high position, and retracted to lower the deck to a ramp position. A locking bar is pivotably mounted atop the telescoping sleeve and the locking bar is controlled by a locking piston and cylinder unit to selectively engage or disengage a recess in the sleeve to thereby lock or unlock the sleeve, and thus constrain the deck to the transport position. A switching and control system is provided to coordinate the control of the main deck piston and cylinder unit with the control of the locking piston and cylinder unit.

13 Claims, 3 Drawing Sheets

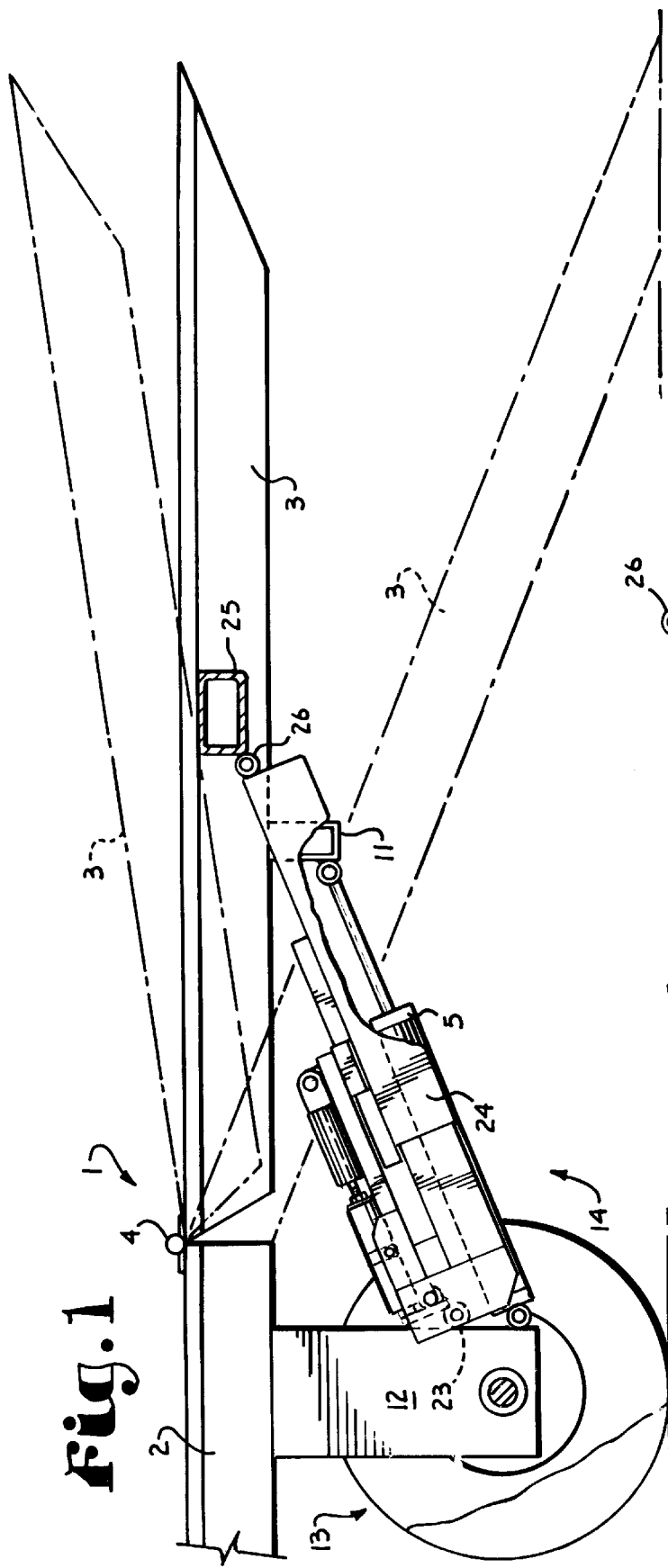
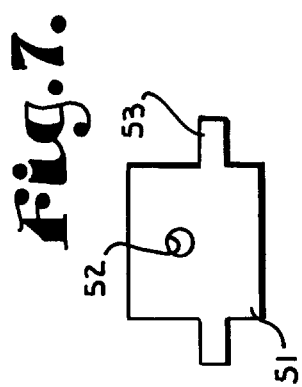
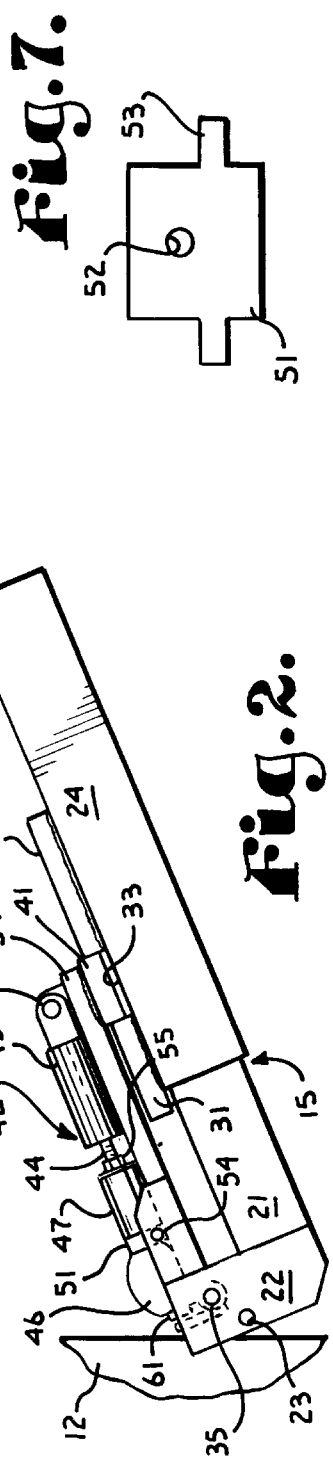

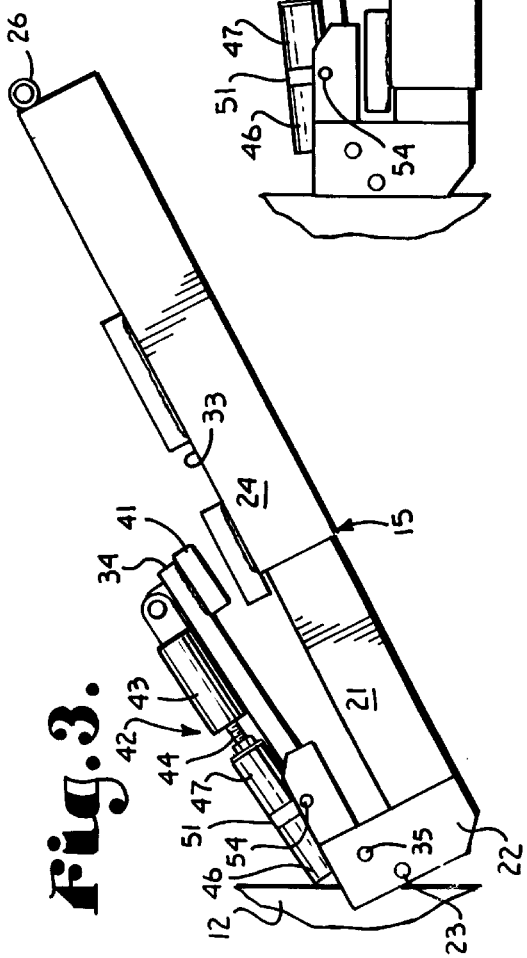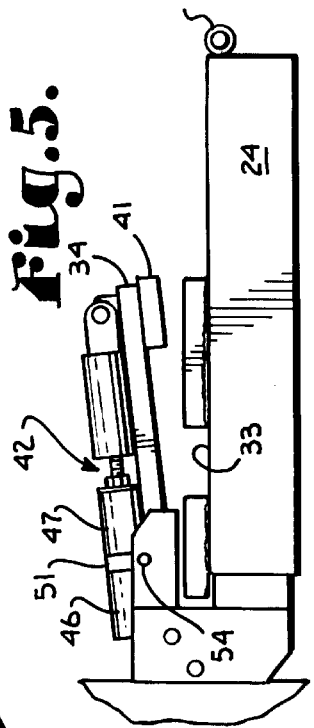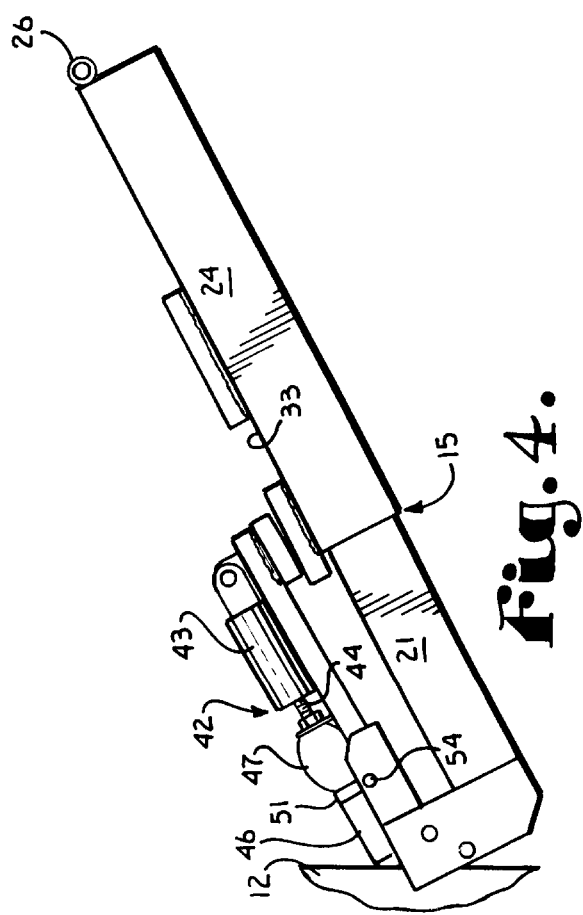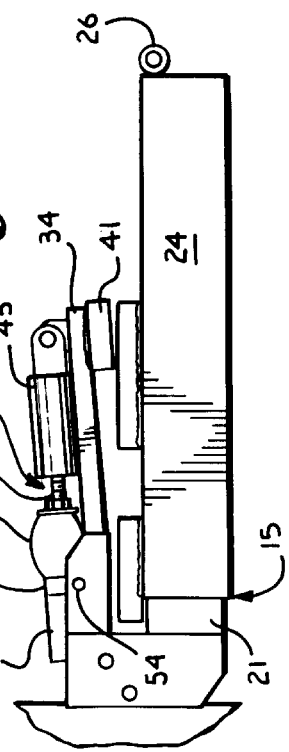

TRANSPORT LOCKING SYSTEM FOR MOVABLE-DECK VEHICLE

BACKGROUND OF THE INVENTION

1. Field of the Invention

The present invention relates generally to vehicles, and, in particular, to trailers with movable-decks or beds which facilitate loading and unloading of vehicles and other cargo items. More particularly, the invention relates to a transport locking system for a movable-deck trailer which includes a telescoping sleeve which extends and retracts as the trailer is raised and lowered, respectively. The sleeve includes a locking recess which is positioned to engage a locking bar when the deck is in a level, transport position. A locking piston and cylinder unit is attached to the locking bar to selectively drive the locking bar toward the locked position or, alternatively, toward an unlocked position.

2. Description of the Related Art

A wide variety of vehicles have heretofore been devised for meeting the requirements of particular load-carrying applications. For cargo-carrying applications, vehicles are commonly provided with decks or beds for supporting the cargo in transit. However, cargo-carrying vehicle decks are often located at inconvenient heights for loading the cargo thereon.

Vehicles are frequently transported on the decks of other vehicles. However, vehicles generally require lifting from the elevation of a paved surface to the elevation of the transport vehicle deck in order to provide for transportation of same. In spite of the loading and unloading problems which must be dealt with logistically, transportation of cargo vehicles on the decks of other vehicles, for a variety of reasons, is often preferred over conventional tow trucks and other transport methods, even for relatively short travel distances.

In order to fulfill this demand, trucks and trailers are available which include integral flatbeds or decks which can be tilted to form a ramp whereby vehicles being transported can be either driven or winched onto the sloping deck from a ground surface, whereafter the deck can be rotated to a generally horizontal travel configuration. The decks in some trucks and trailers can also be tilted upward to a "dock high" position for loading and unloading cargo from an elevated dock or platform.

Examples of tilt-deck trailers include those shown in the Foster U.S. Pat. No. 2,487,325 and the Martin U.S. Pat. No. 2,717,707.

An example of a less costly, improved tilt-deck vehicle is described in application for U.S. Pat. Ser. No. 08/514,691, (the '691 application) filed by the present inventor on Aug. 14, 1995, and entitled MOVABLE-DECK TRAILER, which application is hereby incorporated by reference.

Many such movable-deck vehicles include one or more piston and cylinder units positioned beneath the deck which piston and cylinder unit(s) are in a neutral position when the deck is in a level, transport position, are extended to raise the deck to a dock high position or are retracted to lower the deck to a ramp position. A problem arises in such movable-deck vehicles where the piston and cylinder unit(s) are also the sole means of holding the deck in the transport position. As the deck is placed under load and as the vehicle bounces up and down due to braking and road conditions, the piston and cylinder unit(s) can retract, thus causing the deck to be unintentionally lowered. This problem can become more pronounced as the trailer ages and the seals in the piston and cylinder unit(s) deteriorate.

It is clear then, that a need exists for a locking system for a movable-deck trailer which positively locks the deck in a transport position. In addition to providing a positive lock, such a locking system should be capable of remote, quick and reliable release when the deck is to be raised or lowered from the transport position.

SUMMARY OF THE INVENTION

A locking system for a movable-deck trailer is provided which includes a telescoping sleeve which is positioned in parallel with a main deck piston and cylinder unit beneath the trailer deck. The main deck cylinder is placed in a neutral position when the deck is in the transport position, is extended to raise the deck to a dock high position, and is retracted to lower the deck to a ramp position. Since the telescoping sleeve is in parallel with the main deck piston and cylinder unit, it is also placed in similar neutral, extended and retracted positions. The telescoping sleeve has a pair of plates welded in position atop thereof which plates are separated to leave a gap therebetween. A locking bar is pivotably mounted atop the telescoping sleeve and the locking bar includes a projection which is sized and positioned to fit within the recess when the telescoping sleeve is in the neutral position. A locking piston and cylinder unit is attached atop the locking bar and includes a pair of urethane sleeves surrounding the piston rod. When the locking piston is retracted, the locking piston and cylinder unit is placed in unlock mode with a first one of the urethane sleeves placed in compression, thus tending to drive the locking bar projection out of the recess. Conversely, when the piston is extended, the locking piston and cylinder unit is placed in lock mode with the second urethane sleeve placed in compression, thus driving the locking bar projection toward the recess.

Thus, when the deck is locked in the transport position, by retracting the locking piston and extending or retracting the main deck piston and cylinder, the deck is unlocked and allowed to move to the dock high or the ramp position. When the main piston and cylinder unit is retracted with the deck in the dock high position or the main piston and cylinder unit is extended with the deck in the ramp position, and the locking piston is extended, the deck will lock in the transport position. A control switching system is provided to coordinate the control of the main piston and cylinder unit with the control of the locking piston and cylinder unit.

OBJECTS AND ADVANTAGES OF THE INVENTION

The principle objects and advantages of the present invention include: providing a transport locking system for a movable-deck trailer with a deck which is hinged and which is attached to a main deck piston and cylinder unit which selectively moves the hinged deck between a substantially horizontal, transport position, a lowered ramp position and a raised dock high position; providing such a transport locking system in which a telescoping locking sleeve is connected in parallel with the main deck piston and cylinder; providing such a locking system in which a locking bar is selectively engageable with the telescoping sleeve when the deck is in the transport position to positively lock the deck in the transport position; providing such a locking system in which a locking piston and cylinder unit includes a pair of urethane sleeves positioned such that the sleeves can be selectively placed under compression by extending or retracting the locking piston; providing such a locking system in which the urethane sleeves, when under compression, respectively urge the locking bar toward the unlocked position or toward the locked position; providing such a locking system in which a control switching system provides coordinated control of the main deck piston and cylinder unit and the locking piston and cylinder unit; and providing such a locking system which is particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a fragmentary side elevational view of a rear portion of a movable-deck trailer equipped with a transport locking system in accordance with the present invention, and having a portion of a near wheel broken away to illustrate the attachment of the locking system to the trailer, with portions of a locking telescoping sleeve broken away to show a main deck piston and cylinder unit, and with a locking piston and cylinder unit placed in a locked position.

FIG. 2 is a fragmentary side elevational view of the transport locking system in a neutral, transport position, and showing the locking piston and cylinder unit placed in a unlocked position.

FIG. 3 is a fragmentary side elevational view of the transport locking system in an extended, dock high position, and showing the locking piston and cylinder unit placed in an unlocked position.

FIG. 4 is a fragmentary side elevational view of the transport locking system in an extended, dock high position, and showing the locking piston and cylinder unit placed in a locked position.

FIG. 5 is a fragmentary side elevational view of the transport locking system in a retracted, ramp position, and showing the locking piston and cylinder unit placed in an unlocked position.

FIG. 6 is a fragmentary side elevational view of the transport locking system in a retracted, ramp position, and showing the locking piston and cylinder unit placed in a locked position.

FIG. 7 is a cross-sectional view of a pivot washer in the transport locking system, taken along line 6—6 of FIG. 1.

DETAILED DESCRIPTION OF THE PREFERRED EMBODIMENTS

I. Introduction and Environment

Figure 8:
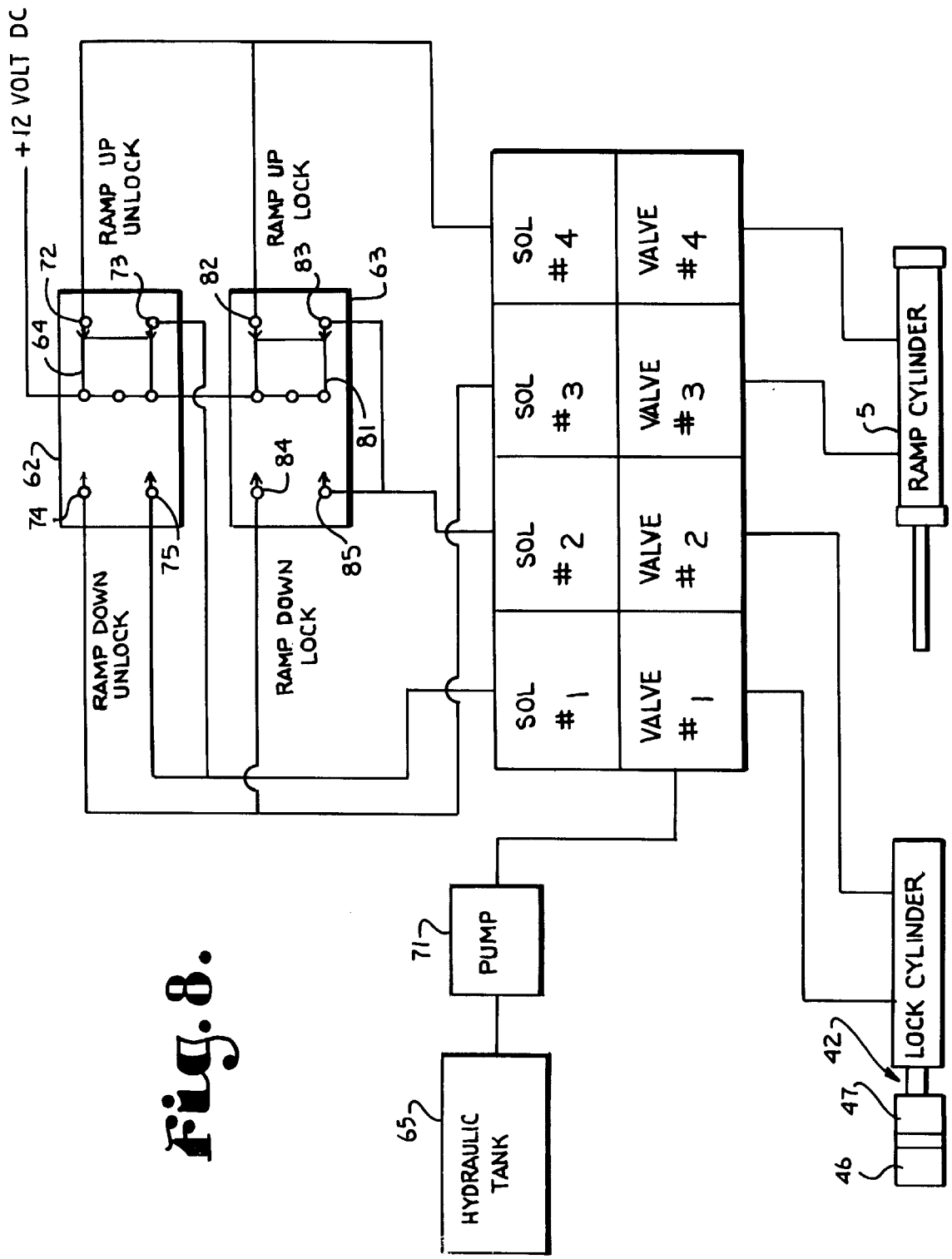
FIG. 8 is an electrical and hydraulic schematic diagram of a switching and control system for coordinated control of the main deck piston and cylinder unit and the locking piston and cylinder unit.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. Said terminology will include the words specifically mentioned, derivatives thereof and words of a similar import.

Referring to the drawings in more detail, reference numeral 1 generally designates a movable-deck trailer embodying the present invention. The trailer 1 generally comprises a stationary deck portion 2 and a movable deck 3 hingedly connected via a hinge 4. A conventional main deck piston and cylinder unit 5 is pivotably connected at an upper end to a beam 11 forming a portion of the movable deck 3, and at a lower end to a vertical beam 12 attached between a wheeled carriage 13 and the stationary deck portion 2. In known fashion, the deck piston and cylinder unit 5, when placed in a neutral position as shown in FIG. 1, pivots the movable deck 3 to a level, transport position, as shown in solid lines in FIG. 1. When the main deck piston and cylinder unit 5 is extended, it pivots the movable deck 3 upward to a dock high position, as shown in dotted lines in FIG. 1. Finally, when the main deck piston and cylinder unit 5 is retracted, it pivots the movable deck 3 downward to a ramp position, also as shown in dotted lines in FIG. 1. Although only one main deck piston and cylinder unit 5 is illustrated, it should be noted that two or more such units can be provided for use in tandem on the trailer 1.

The transport locking system, generally indicated at 14, includes a telescoping locking sleeve 15 including an inner rectangular tube 21 with one end attached between a pair of plates 22 which plates 22 are pivotably connected to the vertical beam 12 via a hinge 23. An outer rectangular tube 24 is pivotably connected to a beam 25 on the movable deck 3 via a hinge 26. The telescoping sleeve 15 is thus essentially placed in parallel with the main deck piston and cylinder unit 5. Thus, like the main deck piston and cylinder unit 5, the sleeve 15 has a neutral, transport position (FIGS. 1 and 2), an extended, dock high position (FIGS. 3 and 4) and a retracted, ramp position (FIGS. 5 and 6).

A pair of plates 31 and 32 are welded in place atop the outer rectangular tube 24 and are spaced from each other to leave a gap 33. A locking bar 34 is attached to a pivot point 35 extending between the plates 22 and the locking bar 34 includes a downwardly directed projection 41 which is sized to fit within the gap 33. A locking piston and cylinder unit 42 includes a hydraulic cylinder 43 and a threaded piston rod 44. The cylinder 43 is attached to the locking bar 34 via a clevis 45. A pair of urethane sleeves 46 and 47 surround the piston rod 44, one on either side of a pivot washer 51. The pivot washer 51, which is illustrated in FIG. 7, is a rectangular plate with a central through bore 52 for receiving the piston rod 44 and a pair of ears 53 extending outward therefrom. The ears 53 extend through a corresponding pair of bores 54 in the plates 22 to provide a pivot point for the locking piston and cylinder unit 42 relative to the locking bar 34. A first threaded nut 55 is attached to the piston rod 44 to secure the urethane sleeve 47 between the nut 55 and the pivot washer 51 while a terminal threaded nut is attached to the piston rod 44 to secure the urethane sleeve 46 between the nut 61 and the pivot washer 51. The tension on each urethane sleeve 47 and 46 is adjustable via the respective nuts 55 and 61.

FIG. 8 illustrates a schematic of a switching and control circuit for the transport locking system 14 and the main piston and cylinder unit 5. A pair of double pole, double throw, momentary contact switches 62 and 63 are provided for both raising and lowering the movable deck 3, as well as locking and unlocking the transport locking system 14.

Referring to switch 62, when a movable double pole contact 64 is thrown to the right, i.e. to the Ramp up—Unlock position, the main deck piston and cylinder 5 is placed in a ramp up mode by hydraulic fluid provided from a reservoir 65 and a pump 71 via valve #4 as controlled by solenoid #4 through contact 72. Simultaneously, the locking piston and cylinder 42 is placed in unlock mode by hydraulic fluid provided from reservoir 65 and pump 71 via valve #1 as controlled by solenoid #1 through contact 73. When the movable double pole contact 64 is thrown to the left, i.e. to the Ramp Down—Unlock position, the main deck piston and cylinder 5 is placed in a ramp down mode by hydraulic fluid via valve #3 as controlled by solenoid #3 through contact 74. Simultaneously, the locking piston and cylinder 42 is placed in unlock mode by hydraulic fluid provided via valve #1 as controlled by solenoid #1 through contact 75.

Referring to switch 63, when a movable double pole contact 81 is thrown to the right, i.e. to the Ramp Up—Lock position, the main deck piston and cylinder 5 is placed in a ramp up mode by hydraulic fluid provided from reservoir 65 and pump 71 via valve #4 as controlled by solenoid #4 through contact 82. Simultaneously, the locking piston and cylinder 42 is placed in lock mode by hydraulic fluid provided via valve #2 as controlled by solenoid #2 through contact 83. When the movable double pole contact 81 is thrown to the left, i.e. to the Ramp Down—Lock position, the main deck piston and cylinder 5 is placed in a ramp down mode by hydraulic fluid via valve #3 as controlled by solenoid #3 through contact 84. Simultaneously, the locking piston and cylinder 42 is placed in lock mode by hydraulic fluid provided via valve #2 as controlled by solenoid #2 through contact 85.

In operation, when the movable deck 3 of the trailer 1 is positioned in the level, transport position, it is locked via the projection 41 of the locking bar 34 fitted into the gap 33. This prevents the outer sleeve 24 of the telescoping locking sleeve 15 from moving, thus constraining the position of the deck 3 to a level position. In the locked transport position, the locking piston and cylinder unit 42 is placed in the lock mode by extending the piston 44, which neutralizes the urethane sleeves 46 and 47 (or places them under slight compression depending upon adjustment).

When it is desired to raise the deck 3 from the transport to the dock high position, the switch 62 is thrown to the right, causing the locking piston and cylinder unit 42 to be placed in the unlock mode by retracting the piston 44, which places the outer urethane sleeve 46 under compression, as shown in FIG. 2. The length of travel of the locking piston rod 44 from a locked to an unlocked position can be as little as ½". The compressed sleeve 46, which can generate up to 1200 lbs. of force, thus tries to drive the locking piston and cylinder unit 42, and the attached locking bar 34 and projection 41 to pivot upward and out of the recess 33. Simultaneously the main deck piston and cylinder unit 5 is extended, thus raising the deck 3 to the dock high position, as shown in FIG. 3. Note that, when the locking piston and cylinder unit 42 is in the unlocked, i.e. retracted, mode, as the locking bar 34 and projection 41 are driven out of engagement with the recess 33, the urethane sleeves 46 and 47 return to neutral or slight compression, as shown in FIG. 3. Due to friction between the projection 41 and the periphery of the gap 33, it is sometimes necessary to quickly cycle the switch 62 once or twice to "rock" the movable deck 3 in order to release the projection 41 from the gap 33.

Now when it is desired to return the movable deck 3 to the locked, transport position, the switch 63 is thrown to the left, causing the locking piston and cylinder unit 42 to be placed in the lock mode by extending the piston 44, which places the inner urethane sleeve 47 under compression, as shown in FIG. 4. The compressed sleeve 47 thus tries to drive the locking piston and cylinder unit 42, and the attached locking bar 34 and projection 41 to pivot downward and into the recess 33. Simultaneously the main deck piston and cylinder unit 5 is retracted, thus lowering the deck 3 to the transport position, as shown in FIG. 1, where the compressed urethane sleeve 47 drives the projection 41 into the recess 33, thus locking the deck 3 in the transport position. Note again that, when the locking piston and cylinder unit 42 is in the locked, i.e. extended, mode, as the locking bar 34 and projection 41 are driven into engagement with the recess 33, the urethane sleeves 46 and 47 return to neutral or slight compression, as shown in FIG. 1.

When it is desired to lower the deck 3 from the transport to the ramp position, the switch 62 is thrown to the left, causing the locking piston and cylinder unit 42 to be placed in the unlock mode by retracting the piston 44, which places the outer urethane sleeve 46 under compression, as shown in FIG. 2. The compressed sleeve 46 tries to drive the locking piston and cylinder unit 42, and the attached locking bar 34 and projection 41 to pivot upward and out of the recess 33. Simultaneously the main deck piston and cylinder unit 5 is retracted, thus lowering the deck 3 to the ramp position and neutralizing the urethane sleeves 46 and 47, as shown in FIG. 5. Again, it is sometimes necessary to hydraulically "rock" the movable deck to release the projection 41.

Now when it is desired to return the movable deck 3 from the ramp position to the locked, transport position, the switch 63 is thrown to the right, causing the locking piston and cylinder unit 42 to be placed in the lock mode by extending the piston 44, which places the inner urethane sleeve 47 under compression, as shown in FIG. 6. The compressed sleeve 47 thus tries to drive the locking piston and cylinder unit 42, and the attached locking bar 34 and projection 41 to pivot downward and into the recess 33. Simultaneously the main deck piston and cylinder unit 5 is extended, thus raising the deck 3 to the transport position, as shown in FIG. 1, where the compressed urethane sleeve 47 again drives the projection 41 into the recess 33, thus locking the deck 3 in the transport position and neutralizing the urethane sleeves 46 and 47.

The switch 62 can also be moved to the left to move the deck 3 from the dock high position to the ramp position without locking it in the transport position and moved to the right to do the opposite, all while leaving the locking piston and cylinder unit 42 in the unlocked position.

Although a trailer 1 is shown with a deck which is hinged in the middle to provide a movable deck 3 which is capable of movement to a dock high and a ramp position from a level, transport position, the inventive transport locking system 14 can be used with trailers with only ramp or dock high positions and trailers whose entire deck pivots upward and or downward instead of only a portion thereof. Instead of locking the deck 3 in the transport position, the inventive locking system could be used to lock it in the dock high or the ramp position, or separate recesses can be provided for all three positions. Instead of recesses, the telescoping sleeve 15 could include one or more apertures selectively engageable with a rod or the like on the locking bar, it being understood that the term "recess" is intended to encompass any engageable surface on the sleeve 15. Furthermore, the locking system 14 can be used with a movable deck truck as well as a trailer, or with any pivoting ramp system, either mobile or stationary. While the sleeves 46 and 47 have been described as urethane, other materials, such as neoprene, could be used, and while the piston and cylinder units 5 and 42 have been described as hydraulic, pneumatic units, electromagnetic units or other linear actuators could be used instead.

It is thus to be understood that while certain forms of the present invention have been illustrated and described herein, it is not to be limited to the specific forms or arrangement of parts described and shown.

What is claimed and desired to be secured by Letters Patent is as follows:

1. A locking system for a movable-deck vehicle, said vehicle including a deck which is movable between a generally horizontal, transport position and a tilted, loading/unloading position via a deck linear actuator, said locking system comprising:
    a. a telescoping sleeve with a first end attached to a stationary portion of the vehicle and a second end attached to the movable deck, said telescoping sleeve including a recess;
    b. a locking bar pivotably attached to said telescoping sleeve with a projection selectively engageable with said recess to lock said telescoping sleeve, and said movable deck, in a set position; and
    c. an actuator means attached to said locking bar, said actuator means being movable between a locked position in which it drives said projection toward engagement with said recess and an unlocked position in which it drives said projection away from said recess.

2. A locking system as in claim 1, wherein said actuator means comprises:
    a. a locking linear actuator including a rod which is selectively extendable and retractable;
    b. first and second flexible sleeves surrounding said rod;
    c. retaining means for retaining said first and second flexible sleeves on said rod; and
    d. a pivot member attached to said rod between said flexible sleeves, said pivot member pivotally attaching said linear actuator rod to said locking bar.

3. A locking system as in claim 2, wherein said actuator means is placed in said locked position when said rod is extended and is placed in said unlocked position when said rod is retracted.

4. A locking system as in claim 2, wherein, when said recess and projection are engaged with each other, retracting said rod in said actuator means compresses said first flexible sleeve, which first flexible sleeve acts to drive said recess and projection apart.

5. A locking system as in claim 2, and further including a switching and control system, said switching and control system comprising:
    a. a pair of double contact, double throw momentary contact switches for selectively supplying an electrical voltage to a plurality of electrical leads;
    b. a plurality of solenoids connected to said electrical leads and controlling a like plurality of valves connected to respective ends of said deck linear actuator and said locking linear actuator; and wherein
    c. said switches and said solenoids are connected to coordinate the operation of said deck linear actuator and said locking linear actuator in a ramp-up lock mode, a ramp-down lock mode, a ramp-up unlock mode and a ramp-down unlock mode.

6. A locking system as in claim 2, wherein, when said recess and projection are separated from each other, extending said rod in said actuator means compresses said second flexible sleeve, which second flexible sleeve acts to drive said recess and projection together.

7. A locking system for a movable-deck vehicle, said vehicle including a deck which is movable between a generally horizontal, transport position and a tilted, loading/unloading position via a deck linear actuator, said locking system comprising:
    a. a telescoping sleeve with a first end attached to a stationary portion of the vehicle and a second end attached to the movable deck, said telescoping sleeve including a recess;
    b. a locking bar pivotably attached to said telescoping sleeve with a projection selectively engaging said recess to lock said telescoping sleeve, and said movable deck, in a set position; and
    c. an actuator means attached to said locking bar, said actuator means being movable between a locked position in which it drives said projection toward engagement with said recess and an unlocked position in which it drives said projection away from said recess, said actuator means comprising:
        i. a locking linear actuator including a rod which is selectively extendable and retractable;
        ii. first and second flexible sleeves surrounding said rod;
        iii. retaining means for retaining said first and second flexible sleeves on said rod;
        iv. a pivot member attached to said rod between said flexible sleeves, said pivot member pivotally attaching said linear actuator rod to said locking bar; wherein
    d. when said projection and said recess are engaged with each other, retracting said rod in said actuator means compresses said first flexible sleeve, which first flexible sleeve acts to drive said projection out of said recess; and
    e. when said projection and said recess are separated from each other, extending said rod in said actuator means compresses said second flexible sleeve, which second flexible sleeve acts to drive said projection into said recess.

8. A locking system as in claim 7, and further including a switching and control system, said switching and control system comprising:
    a. a pair of double contact, double throw momentary contact switches for selectively supplying an electrical voltage to a plurality of electrical leads;
    b. a plurality of solenoids connected to said electrical leads and controlling a like plurality of valves connected to respective ends of said deck linear actuator and said locking linear actuator; and wherein
    c. said switches and said solenoids are connected to coordinate the operation of said deck linear actuator and said locking linear actuator in a ramp-up lock mode, a ramp-down lock mode, a ramp-up unlock mode and a ramp-down unlock mode.

9. A locking system for a movable-deck vehicle, said vehicle including a deck which is movable between a generally horizontal, transport position and a tilted, loading/unloading position via a deck linear actuator, said locking system comprising:
    a. a telescoping sleeve with a first end attached to a stationary portion of the vehicle and a second end attached to the movable deck, said telescoping sleeve including a recess;

b. a locking bar pivotably attached to said telescoping sleeve with a projection selectively engaging said recess to lock said telescoping sleeve, and said movable deck, in a set position; and c. an actuator means attached to said locking bar, said actuator means being movable between a locked position in which it drives said projection toward engagement with said recess and an unlocked position in which it drives said projection away from said recess, said actuator means comprising:
   i. a locking linear actuator including a rod which is selectively extendable and retractable;
   ii. first and second flexible sleeves surrounding said rod;
   iii. retaining means for retaining said first and second flexible sleeves on said rod; and
   iv. a pivot member attached to said rod between said flexible sleeves, said pivot member pivotally attaching said linear actuator rod to said locking bar.

10. A locking system as in claim 9, wherein said actuator means is placed in said locked position when said rod is extended and is placed in said unlocked position when said rod is retracted.

11. A locking system as in claim 9, wherein, when said projection and said recess are engaged with each other, retracting said rod in said actuator means compresses said first flexible sleeve, which first flexible sleeve acts to drive said projection out of said recess.

12. A locking system as in claim 9, wherein, when said projection and said recess are separated from each other, extending said rod in said actuator means compresses said second flexible sleeve, which second flexible sleeve acts to drive said projection into said recess.

13. A locking system as in claim 9, and further including a switching and control system, said switching and control system comprising:

a. a pair of double contact, double throw momentary contact switches for selectively supplying an electrical voltage to a plurality of electrical leads;

b. a plurality of solenoids connected to said electrical leads and controlling a like plurality of valves connected to respective ends of said deck linear actuator and said locking linear actuator; and wherein c. said switches and said solenoids are connected to coordinate the operation of said deck linear actuator and said locking linear actuator in a ramp-up lock mode, a ramp-down lock mode, a ramp-up unlock mode and a ramp-down unlock mode.

* * * * *